United States Patent
Askerdal et al.

(10) Patent No.: US 10,351,124 B2
(45) Date of Patent: Jul. 16, 2019

(54) METHOD PERFORMED BY A CONTROL UNIT FOR CONTROLLING ENERGY FLOWS OF A VEHICLE

(71) Applicant: VOLVO TRUCK CORPORATION, Göteborg (SE)

(72) Inventors: Mikael Askerdal, Åsa (SE); Mattias Asbogard, Mölnlycke (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 15/515,641

(22) PCT Filed: Oct. 2, 2014

(86) PCT No.: PCT/EP2014/002701
§ 371 (c)(1),
(2) Date: Mar. 30, 2017

(87) PCT Pub. No.: WO2016/050254
PCT Pub. Date: Apr. 7, 2016

(65) Prior Publication Data
US 2017/0297557 A1    Oct. 19, 2017

(51) Int. Cl.
*B60W 20/15*    (2016.01)
*B60W 10/06*    (2006.01)
(Continued)

(52) U.S. Cl.
CPC ............ *B60W 20/15* (2016.01); *B60W 10/06* (2013.01); *B60W 10/30* (2013.01);
(Continued)

(58) Field of Classification Search
None
See application file for complete search history.

(56) References Cited

U.S. PATENT DOCUMENTS

| 2004/0074682 A1 | 4/2004 | Fussey et al. |
| 2005/0246076 A1* | 11/2005 | Chen ............... B60W 10/06 701/22 |

(Continued)

FOREIGN PATENT DOCUMENTS

| EP | 2428419 A1 | 3/2012 |
| JP | H06280594 | 10/1994 |

(Continued)

OTHER PUBLICATIONS

International Search Report (dated May 28, 2015) for corresponding International App. PCT/EP2014/002701.
(Continued)

*Primary Examiner* — Tamara L Weber
(74) *Attorney, Agent, or Firm* — WRB-IP LLP (57) ABSTRACT

In a method performed by a control unit for controlling energy flows of a vehicle, where the vehicle includes a vehicle energy system which in turn includes a plurality of energy subsystems. Within each energy subsystem one form of energy is used. The energy subsystems are operationally connected by converters, wherein converters are devices converting at least one form of energy to another form of energy. By setting a price, limits for the converters converting energy between the energy subsystem the energy flows of the vehicle can be controlled by the control unit such that at least during period of times the order in which the energy subsystems of the vehicle is provided with energy can be changed.

10 Claims, 5 Drawing Sheets

(51) Int. Cl.
  *B60W 10/30* (2006.01)
  *B60W 30/188* (2012.01)
  *F03G 7/00* (2006.01)

(52) U.S. Cl.
  CPC ...... *B60W 30/188* (2013.01); *B60W 30/1886* (2013.01); *B60W 2550/12* (2013.01); *B60W 2900/00* (2013.01); *F03G 7/00* (2013.01); *Y02T 10/56* (2013.01); *Y02T 10/84* (2013.01); *Y10S 903/904* (2013.01)

(56) References Cited

U.S. PATENT DOCUMENTS

| | | | |
|---|---|---|---|
| 2008/0122228 A1* | 5/2008 | Liu | B60K 6/48 290/40 C |
| 2011/0118930 A1 | 5/2011 | Hauptmann et al. | |
| 2013/0002210 A1 | 1/2013 | Gibson et al. | |
| 2013/0166181 A1* | 6/2013 | Pan | F02D 45/00 701/110 |
| 2013/0325214 A1 | 12/2013 | Vos | |
| 2015/0367950 A1* | 12/2015 | Rajashekara | B64O 11/305 701/3 |

FOREIGN PATENT DOCUMENTS

| | | |
|---|---|---|
| JP | H09163506 | 6/1997 |
| JP | 2002240541 | 8/2002 |
| JP | 2007239528 | 9/2007 |
| JP | 2009137340 | 6/2009 |
| JP | 2009253993 | 10/2009 |
| JP | 2011088621 | 5/2011 |
| JP | 2012081970 | 9/2012 |
| JP | 2013-03-21 | 3/2013 |
| JP | 2013091355 | 5/2013 |
| JP | 2013163986 | 8/2013 |
| JP | 2014015131 | 1/2014 |
| JP | 2014512052 | 5/2014 |
| JP | 2014517193 | 7/2014 |
| JP | 2014163323 | 9/2014 |
| WO | 2009083751 A1 | 7/2009 |
| WO | 2012155927 A1 | 11/2012 |

OTHER PUBLICATIONS

Japanese Official Action (dated Sep. 4, 2018) for corresponoing Japanese App. 2017-517716.

* cited by examiner

METHOD PERFORMED BY A CONTROL UNIT FOR CONTROLLING ENERGY FLOWS OF A VEHICLE

BACKGROUND AND SUMMARY

The present invention relates to the field of methods for managing energy flows within an energy system of a vehicle. The invention can be applied in heavy-duty vehicles such as trucks and busses, as well as for other type of vehicles such as passenger cars.

Due to increasingly stringent legislation and an increasing interest from the market fuel efficiency has been one of the main drivers for passenger cars for many years. However, today fuel efficiency is one of the main drivers not only for passenger cars but also for heavy duty vehicles and other commercial vehicles. The combustion engine and the powertrain has been refined for many years, and it is becoming more and more difficult to make large improvements in order to improve the fuel efficiency. Instead all aspects of the engine, the powertrain and the control functionalities have to be considered. All small improvements, especially if the improvement can be achieved without adding substantial cost, are important and worth to pursue.

One possible approach for improving the fuel efficiency is by implementing a control method optimizing the energy management of the energy system of a vehicle such that no more power than what is required at a certain time is produced, that the available total amount of power at a certain time is distributed in the energy system in the most efficient way and that the available total amount of power is used in the best possible way. How much power that needs to be produced, where in the energy system and how this power should be consumed or stored is however far from trivial to determine. There are many energy systems, components or functionalities of a vehicle that consume energy. A significant portion of the available energy is naturally used for the propulsion of the vehicle but auxiliary systems such as air condition systems, vehicle compartment heating systems, power steering etc. also consume a large portion. More or less all different consumers of energy of an energy system are affecting one another and therefore cannot be considered independently. Also, the circumstance during which the optimization is to be preformed is changing continuously. This makes the tuning process of the control method time consuming and complex, and since it is directly dependent on the present setup it needs to be redone at the slightest change of the setup.

Even if the powertrains of heavy duty vehicles of today generally are very powerful they are not that powerful that when a number of auxiliary systems are running constant speed can be maintained when driving up a steep hill fully loaded. Also, during acceleration when a number of auxiliary systems are running, such as at a takeover manoeuvre during a hot summer night, the driver cannot expect to always get the requested increase in engine output. This may be something that drivers of heavy duty vehicles such as trucks or busses are used to but is still undesirable both from a driveability and safety perspective. This is partly due to the fact that the auxiliary systems, where both essential systems such as power-steering and brakes, and less essential systems such as seat heating systems or electric window lifts, are included, generally is provided with energy first and the remaining available energy is subsequently used for propulsion. In principle, what has been described as a problem for heavy duty vehicles also applies for passenger cars even if the problem with insufficient engine output is less significant.

WO 2012155927, hereby considered to be incorporated by reference, discloses an energy management system of a vehicle wherein activation agents control the energy flows within the vehicle. Said activation agents control main systems and auxiliary systems of the vehicle by adapting pricing rules. The energy is traded between the energy main systems and the auxiliary systems. The price of energy varies depending on the momentary supply of energy for the vehicle. Each main system has a price at which it will provide energy and each auxiliary system has an individual price limit up to which the auxiliary system will purchase energy. Above this individual price limit the auxiliary system will not purchase any energy. Some auxiliary systems have variable individual price limits and some auxiliary systems have fixed individual price limit. The price of energy is dependent on the amount of available energy, and based on the individual price limits of respective auxiliary system the activation agents of said main systems and auxiliary systems decides whether respective system should be activated or not.

It is desirable to provide an improved method performed by a control unit for managing the energy flows within an energy system of a vehicle, especially a method where adaptive price limits are used in order to improve driveability, performance and safety. The present invention further comprises, according to an aspect thereof, a computer program comprising program code means for performing the steps of the method when said program is run by a control unit, a computer readable medium carrying such a computer program and the control unit itself. Further advantages and advantageous features of the present invention are disclosed in the following description and the dependent claims.

Control methods for optimising energy utilisation are, preferably urn by control units. Vehicles of today comprise numerous control units controlling different functionalities of the vehicle such as e.g. TCU, Transmission Control Unit, primarily controlling the transmission or BCU, Brake control unit, primarily controlling the braking system. Also many single components comprise local controllers controlling the functionality of respective component, such as e.g. a brake actuator or a hydraulic or electric actuator of a power steering. The different control units and local controllers interact in order to control the vehicle such that the actual control of the vehicle is performed not by one single control unit but by a network of control units, i.e. distributed vehicle control. Thus, when referring to control unit herein this necessarily does not mean that the method or like is performed by one single control unit, but that the method may be performed by a distributed control unit comprising numerous interacting control units and local controllers. This is also referred to as the computer of the vehicle. A computer is by definition a programmable electronic device that can retrieve, store, process and redistribute information, thus the same operations as the control unit, being a single component or a network of interacting components, is provided to perform.

Vehicle energy management systems are generally configured such that the total amount of available energy of a vehicle is distributed such that all the auxiliary systems are provided with energy first and the propulsion system have to settle with the remains. Thus, no real prioritization between important auxiliary systems and less important auxiliary systems, nor any assessment of if the propulsion of the vehicle perhaps should be prioritized, is performed.

The present invention comprises a method performed by a control unit for controlling energy flows of a vehicle, wherein the vehicle comprises the control unit and an energy system which in turn comprises a plurality of energy subsystems. In every energy subsystem one specific form of energy is used, such as e.g. mechanical energy, electrical energy or pneumatic energy. Mechanical energy is e.g. used for the propulsion of the vehicle but may also be used to drive other auxiliary systems such as mechanically driven cooling fans or an air condition compressor. The energy subsystems are operationally connected by converters. Converters are devices convening at least one form of energy to at least another form of energy. Converters are provided in order to control the energy flows within the vehicle.

For all single energy subsystem considered when using the method of the present invention there is at least one converter converting energy to said energy subsystem from another energy subsystem and at least one converter convening energy from said energy subsystem to another energy subsystem. For an energy subsystem a converter converting energy to said energy subsystem is a producer and a converter convening energy from said energy subsystem is a consumer. Thus, for a single energy subsystem one can talk about energy producers and energy consumers, but when considering the complete energy system the energy producers and consumers are merely converters acting as a producer in one energy subsystem and as consume in another energy subsystem. Converters enable that energy can be provided between different energy subsystems using different forms oaf energy. However, converters do not necessary need to be defined as converting energy both from an energy subsystem and to an energy subsystem. E.g. an internal combustion engine (ICE) may be defined as a converter only delivering energy to the mechanical energy subsystem or as an energy converter converting chemical energy (fuel) to mechanical energy. This is all a matter of how the energy subsystems are defined. The method of the present invention is applicable independently of how the energy subsystems are defined.

One energy subsystem is a mechanical energy subsystem in which mechanical energy is the form of energy used. The mechanical energy subsystem, generally comprises at least an ICE, which is one important energy producer of the vehicle. An ICE can be seen as a converter converting energy from a fuel energy subsystem to the mechanical energy subsystem, where the ICE would be a unidirectional converter converting energy from a fuel energy subsystem to the mechanical energy subsystem. However, herein the ICE will be referred to as an energy producer providing mechanical energy to the mechanical energy subsystem.

Most converters are associable with one identifiable function of the vehicle. E.g. the AC compressor of an air condition system can be seen as a converter converting mechanical energy from the mechanical energy subsystem (the air condition compressor is generally connected to the ICE by a compressor clutch) to AC cooling energy of an, air condition energy subsystem. Another example of a converter is an electrical machine. The electrical machine is a bidirectional converter since it is able to both convert mechanical energy to electrical energy (from the mechanical enemy subsystem to the electrical energy subsystem), preferably when there is a surplus of mechanical energy within the mechanical energy subsystem, and electrical energy to mechanical energy, e.g. if there is a need of additional mechanical energy. Note that there might be more than one energy subsystem of respective form of energy.

The converters are controlled by the control unit, and by controlling the converters it is possible to control how the available energy is provided between different energy subsystems, wherein each energy subsystem can be defined to represent one auxiliary system of the vehicle. Thus, by controlling the energy converters of a vehicle it is possible to control respective auxiliary system.

Herein the use of mechanical energy of the mechanical energy subsystem for providing propulsion of the vehicle is considered to be conversion of energy. Propulsion can be considered, to be conversion of mechanical energy to translational kinetic energy, for which the drivetrain, comprising drive shafts, transmission, wheels etc. can be considered to be the converter. Thus the drivetrain acts as a converter for converting mechanical energy from the mechanical energy subsystem to translational kinetic energy, or energy used for propulsion of the vehicle, provided to a propulsion energy subsystem. According to the present invention by controlling the energy flow to the propulsion energy subsystem it is possible to control the energy used for propulsion by the propulsion system.

Further, according to the present invention the control unit is continuously:

setting a unitary energy price for a quantity of energy used within respective energy subsystem.

The respective unitary energy price set for respective energy subsystem is set according to a first sample frequency, having a sample interval t+n. The respective unitary energy price is dependent on a total energy demand and a total energy supply of respective energy subsystem. During said sample interval t+n is additionally the following performed by the control unit:

providing a quantity of power to a first energy subsystem from a second energy subsystem.

The provided quantity of power corresponds to a determined supplied quantity of power of a common converter, wherein the common converter is a converter which the first and second energy subsystem have in common, at the unitary energy price of said first energy subsystem. The quantity of power provided is limited by power limitations of the common converter.

In simple terms; the common converter provides the quantity of energy from the second energy subsystem to the first energy subsystem that corresponds to a determined quantity of power that the common converter provides at the unitary energy price of the first energy subsystem. The unitary energy price of respective energy subsystem may be set using any available pricing method.

Methods used by the control unit for calculating unitary energy prices are typically either looking at previous events to determine what price that is likely to sustain the buffer level in the long run or are trying to predict how the price should be set. For energy systems comprising at least one energy buffer one simple pricing method could be to simply set the unitary energy price as a function of the current amount of energy stored in respective energy buffer. For an example where the only energy buffer of an energy system is an electrical battery the unitary energy price would then be a function of the State of Charge (SoC) of that electrical battery. Generally, the higher the current amount of stored energy is the lower will the unitary energy price of energy from that energy subsystem be. According to a development of this pricing method the momentary energy flow to such energy buffer, or from such energy buffer, may also be considered. Another possible pricing method is provided by using model predictive control, relying on e.g. dynamic models of linear empirical models obtained by system identification. Yet other possible pricing methods, using more advanced and computationally intensive pricing methods are available, e.g. based on dynamic programming.

The present invention is characterised by that the following additionally is performed by the control unit:

setting an individual energy price limit for a converter converting energy from one energy subsystem to another energy subsystem.

The individual price limits determines the maximum price for which respective converter, converting one specific form of energy from one specific energy subsystem to one other specific form of energy of one other specific energy subsystem, converts energy. If the unitary energy price for energy of the providing, energy subsystem is higher than the individual energy price limit no energy will be convened.

An example of an individual price limit is an electric generation price limit.

One exemplary electric generation price limit is the maximum unitary energy price of a mechanical energy subsystem at which mechanical energy will be converted by e.g. an electric machine (converter) to electrical energy of an electrical energy subsystem.

A second example is a compressed air price limit.

One exemplary compressed air price limit is the maximum unitary energy price of a mechanical energy subsystem at which mechanical energy will be converted by a compressor (converter) to pneumatic energy of a pneumatic energy subsystem.

Note that there may be embodiments of the present invention with more than one individual price limit for e.g. engine cooling energy. Engine cooling energy (which is provided to an engine cooling energy subsystem) may e.g. be provided both by an electrically driven fan (converter) converting electrical energy (which is provided from the electrical energy subsystem) or by a mechanically driven fan (converter) convening mechanical energy (which is provided from the mechanical energy subsystem).

Thus, when the control unit runs the method a converter will only provide energy to the first energy subsystem from said second energy subsystem if the unitary energy price of said second energy subsystem is lower than said price limit of said converter.

When hereinafter referring to a price limit for a specific form of energy what really is referred to is the maximum unitary energy price of an energy providing energy subsystem at which a converter is allowed to convert one form of energy from the energy providing energy subsystem to the specific form of energy of the energy subsystem of the specific form of energy. Thus, the propulsion price limit is the maximum unitary energy price of a mechanical energy subsystem at which mechanical energy will be converted by a drivel-rain (converter) to energy used for propulsion of the propulsion energy subsystem.

The individual price limits will be set by the control unit according to how critical the functionality of respective energy converter is. E.g. the functionality of an air compressor (converter convening mechanical energy to pneumatic energy used for braking) may be more important than the functionality of an AC compressor (converter converting mechanical energy (for driving the AC compressor and cooling down a refrigerant) to AC cooling energy). The highest price limits will be set by the control unit for the most critical systems and the lowest price limit on the least critical systems. Thus, the price limit for the air compressor will be set higher than the price limit for an AC compressor. To give yet one example; by setting an energy prize limit of the actuator activating an anti-spin functionality which is higher than an energy prize limit of an actuator of electrical window lifts it is possible to ensure that in case of lack of electrical energy of an electrical energy subsystem the actuator (converter) activating anti-spin functionality will be provided with electrical energy over the actuator of electrical window lifts. By that the control unit applies the present invention for propulsion also the importance of propulsion can be prioritized in regards to other auxiliary systems.

By applying the inventive method when there is an overall lack of energy within the energy system the distribution of energy is controlled by the control unit such that the most important auxiliary systems are provided with energy first. Ensuring that the functionality of important vehicle functionalities such as brakes, engine cooling etc. are maintained will improves safety. It may also improve the driveability. By applying the inventive method it is possible to prioritize propulsion power such that in many driving situations the driver will get the same propulsion power independently of the number of other auxiliary systems that are active. This will increase the predictability of the vehicle which will improve driver comfort as well as safety.

According to one aspect of the present invention an energy system comprises at least a mechanical energy system and a propulsion energy system. One of the main advantages with the present invention is that the controllability of energy used for propulsion of the vehicle is improved. By setting an individual price limit for energy used for propulsion it is possible to at least during a period prioritize propulsion of the vehicle higher than e.g. an air condition system, if it is considered that the air condition system temporarily is less important. This means that more energy will be used for propulsion which will improve the performance of the vehicle, especially during short accelerations or short uphill drives.

According to another aspect of the present invention the control unit is setting a common price limit for all converters converting energy from one common energy subsystems to another common energy subsystem. Thus, if two different energy converters convert the same form of energy from the same energy subsystem to another common energy subsystem the energy price limits for those two converters are set to be equal.

As disclosed, according to aspects of the present invention the respective price limits are provided with a prioritisation by the control unit, such that a more prioritised energy subsystem is provided with a higher price limit. A higher price limit for an auxiliary system entails that respective auxiliary system will be provided with energy longer as the unitary energy price of respective energy providing energy subsystem increases. Applying a prioritisation enables that that essential auxiliary systems such as brakes, power steering, engine cooling systems etc. are guaranteed continuous supply of required energy but that the order in which remaining, not essential auxiliary systems are provided can be adapted depending on current conditions. This will first and foremost affect how much of the available energy that will be used for propulsion. When driving uphill or during acceleration it may e.g. be possible to prioritize propulsion higher than e.g. air condition systems which will improve the ICE response and the vehicle performance.

There are different possible methods for which the control unit is managing the order of prioritisation of the different energy subsystems or auxiliary systems. The prioritisation of essential auxiliary systems may be fixed, either in regards to one another or at fix price limits, or all price limits of auxiliary systems may be adaptable. The price limits may also be more or less adaptable depending of prevailing conditions such as e.g. overall available amount of energy or SoC of an energy buffer. It is also possible to apply aspects of the present invention wherein independently of how the current prioritisation is set by the control unit, during certain conditions the prioritisation is over ruled and a prioritisation prioritizing the most essential auxiliary systems are implemented. A selected number of exemplary aspects regarding how price limits can be set are presented below.

According to one aspect of the present invention at least a number of price limits are predetermined. Using predefined price limits for the most essential energy subsystems can be used to ensure that the functionality of the most essential vehicle functionalities are sustained even during periods where there is an overall shortage of available energy within the energy system.

According to another aspect of the present invention the setting of respective price limit for respective energy subsystem by the control unit is dependent on a driver command. Such driver command may e.g. be that the acceleration pedal is fully depressed. If the acceleration pedal is fully depressed that may be an indication of that maximum propulsion power is requested such as during take over. A complete energy system review may be performed by the control unit assessing whether it is possible to temporarily prioritise propulsion over e.g. charging of an electric battery by electric generation. Such assessment may be done by the control unit according to any suitable conditions. If so, the propulsion price limit may be temporarily increased to be higher than e.g. the electric generation price limit allowing the propulsion energy system to be provided with energy longer as the unitary energy price of mechanical power from the mechanical energy subsystem increases.

According to yet one, other aspect of the present invention said driver command may be at least one among; selecting a driving mode or selecting a driver specific vehicle setting. One advantageous approach of managing the prioritisation of auxiliary system is by associating the prioritisation of auxiliary systems to different driving modes of the vehicle. In the vehicles of today it is often possible to select between different driving modes such as e.g. Eco, Performance, Electric Drive or like. E.g., if an electric mode is selected electric generation may be prioritised such that charging of an electric battery, enabling electric drive, is optimized. If instead e.g. Performance or like is selected may instead the propulsion of the vehicle be prioritised. This opens up the possibility for increased driver interaction and tailoring the vehicle properties.

Different drivers may have different needs and requirements when it comes to vehicle and driving characteristics. For some driver it may be prioritised that the vehicle compartment temperature is as constant as possible, for some drivers instant engine response when depressing the acceleration pedal is prioritised whereas for some drivers to periodically drive the vehicle solely on energy from the electrical battery, if possible, is most important. Depending on what requirements a driver has the prioritisation of how the auxiliary systems are provided with energy may be tailored for the individual driver. This is done by that the control unit is setting the price limits for respective auxiliary system according to what is required. Driver specific settings are today used for e.g. assigning specific driver seat settings for respective driver and may e.g. be applied by that every driver has an individual car key or that every driver enters an individual pin-code before starting the vehicle. Individual price limits could also be associated with e.g. individual car keys or pin-codes.

Except for driver input also ambient conditions may be considered when the control unit it setting respective price limits. Thus, according to one aspect of the present invention the control unit is
setting respective price limit dependent on at least one ambient condition.

Adaption of the price limits based on ambient conditions can be used singly or in combination with adaptions of the price limits based on driver input. The ambient conditions on which the setting of price limits is dependent are preferably ambient conditions that in one way or another are relevant for at least one auxiliary system. Such ambient conditions may be at least one of:
topography, ambient temperature, air humidity, indication of slippery road conditions, driving schedule, wet conditions or sunny conditions.

E.g. indications of slippery road conditions may imply that it is prioritised that an anti-spin system is activated. In order to activate the anti-spin system it is necessary that required amount of electrical energy is available. This is ensured by that the control unit is increasing the price limit for generation of electric energy by convening mechanical energy. During periods with a shortage of energy in the energy system mechanical energy used for electric generation will be one of the highest prioritised and will be supplied with energy even as the unitary energy price of the mechanical energy subsystem increases.

Correspondingly, ambient temperature, air humidity and sunny conditions may affect the vehicle compartment temperature, wet conditions may affect the windshield wipers. Driving schedule, which herein also is considered, to be an ambient condition, may e.g. affect compressor price limit (e.g. if it is predicted that respective vehicle will drive short distances with reoccurring braking, such as for a city bus).

These are a few examples of ambient conditions that may affect the prioritisation of how auxiliary systems are provided with energy by setting respective individual price limits. However, as is apparent for a person skilled in the art also other ambient conditions may be used.

Using driver commands as input to the present invention has the advantage that e.g. energy consumption properties or driving characteristics easily can be adapted to the individual requirements and conditions of respective driver. Using ambient conditions as input to the present invention has the advantage that the available energy, can be distributed such that t e for the moment most important auxiliary systems are prioritised over other, currently not that important systems. This will improve driveability as well as safety.

According to one aspect of the present invention the control unit is:
updating the price limit of respective converter according to a second sample frequency.

According to yet one aspect of the present invention the second sample frequency is longer than said first sample frequency. As previously is stated the setting of unitary energy prices of respective energy subsystem and, based or set unitary energy prices, subsequently providing energy between respective energy subsystems is performed according to the first sample frequency by the control unit. Controlling the energy flows of an energy system of a vehicle by controlling how is provided between the energy subsystems is the purpose of the present invention. However, the setting of individual price limits, supporting how the energy transfers between energy subsystems should be performed, may be performed according to a longer sample frequency. The setting of price limits is important aspect of the present invention, but setting a longer sample frequency will not impair the functionality of the present invention. However, by setting a longer sample frequency for the updating of price limits for respective energy converter the overall computational power required by control unit when running the method of the present invention is lowered.

As previously discussed possible methods for setting the unitary energy price may be any suitable out of the many pricing methods available. According to one preferred aspect a pricing method derived from the Marshallian micro economics theory based on supply and demand is used by the control unit.

By applying aspects of the Marshallian micro economics theory, herein referred to as the theory of supply and demand, for setting, the unitary energy prices of respective energy subsystem it is possible to obtain the momentary optimum energy balance for the energy system where the energy needs and quantities of available power of respective energy subsystems are in balance. According to such pricing method each producer producing any form of energy is provided with an energy supply price function, wherein the energy supply price function is providing the relation between price and quantity for the tower respective energy producer is able to provide to an energy subsystem. The efficiency of an energy converter, which here is considered as an energy producer, is dependent on the amount of converted power. Thus an energy supply price function is describing how the unitary energy price of that energy producer changes with supplied quantity of power from respective producer.

Further, each consumer consuming any form of energy is provided with an energy demand price function, wherein the energy demand price function is providing the relation between price and quantity for the power respective energy consumer demands from an energy subsystem. As previously stated the efficiency of an energy converter, which here is considered as an energy consumer, is dependent on the amount of convened power. Thus, an energy demand price function is describing how the unitary energy price of an energy consumer changes with consumed quantity of power.

If an energy buffer is present in an energy subsystem the energy buffer acts as a consumer if said buffer is provided with energy from said energy subsystem and as a producers if said energy buffer is providing energy to said energy subsystem.

Respective energy supply price function and respective energy demand price function is dependent on parameters specific for respective energy producer and energy consumer. By that the control unit is summarizing all energy supply price functions, of all components possibly acting as producers of an energy subsystem it is possible to obtain an aggregated energy supply price function describing the total energy supply of respective energy subsystem. Correspondingly, by summarizing all energy demand price functions of all components possibly acting as consumers it is possible to obtain an aggregated energy demand price function describing the total energy demand of respective energy subsystem.

If an energy buffer is present such energy buffer will contribute both with an energy supply price function and an energy demand price function for respective energy subsystem, since such energy buffer potentially may act as either a producer or a consumer within said energy subsystem.

By that the control unit is comparing said aggregated supply price function and said aggregated demand price function of an energy subsystem it is possible to obtain the optimum unitary energy price of that energy subsystem, where there is balance between energy supply and energy demand of ail producers, consumers and energy buffers of respective energy subsystem. This optimum unitary energy price is where the aggregated supply price function and the aggregated demand price function coincide.

The unitary energy price of an energy subsystem calculated by applying the theory of supply and demand can be used as unitary energy price when the control unit is applying the method of the present invention.

The present invention also comprises a computer program comprising program code means for performing the steps of any of the embodiments of the method of the present invention when said program is run by a control unit. Further, the present invention comprises a computer readable medium carrying a computer program comprising program code means for performing the steps of any embodiment of the method when said program product is run by a control unit. Finally, the present invention comprises the control unit as previously has been disclosed. It is important to point out that the method of the present invention performed by the control unit, herein described predominantly in connection to how the available amount of energy can be distributed between e.g. energy used for propulsion and energy used to provide electrical energy to electrically driven auxiliary systems may be implemented to comprise essentially all functionalities of a vehicle. By implementing the method and looking only at the electrical energy subsystem it is e.g. possible to determine the order of priority between energy used for seat heaters, automatic window lifts and the vehicle audio system by setting respective price limits accordingly.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
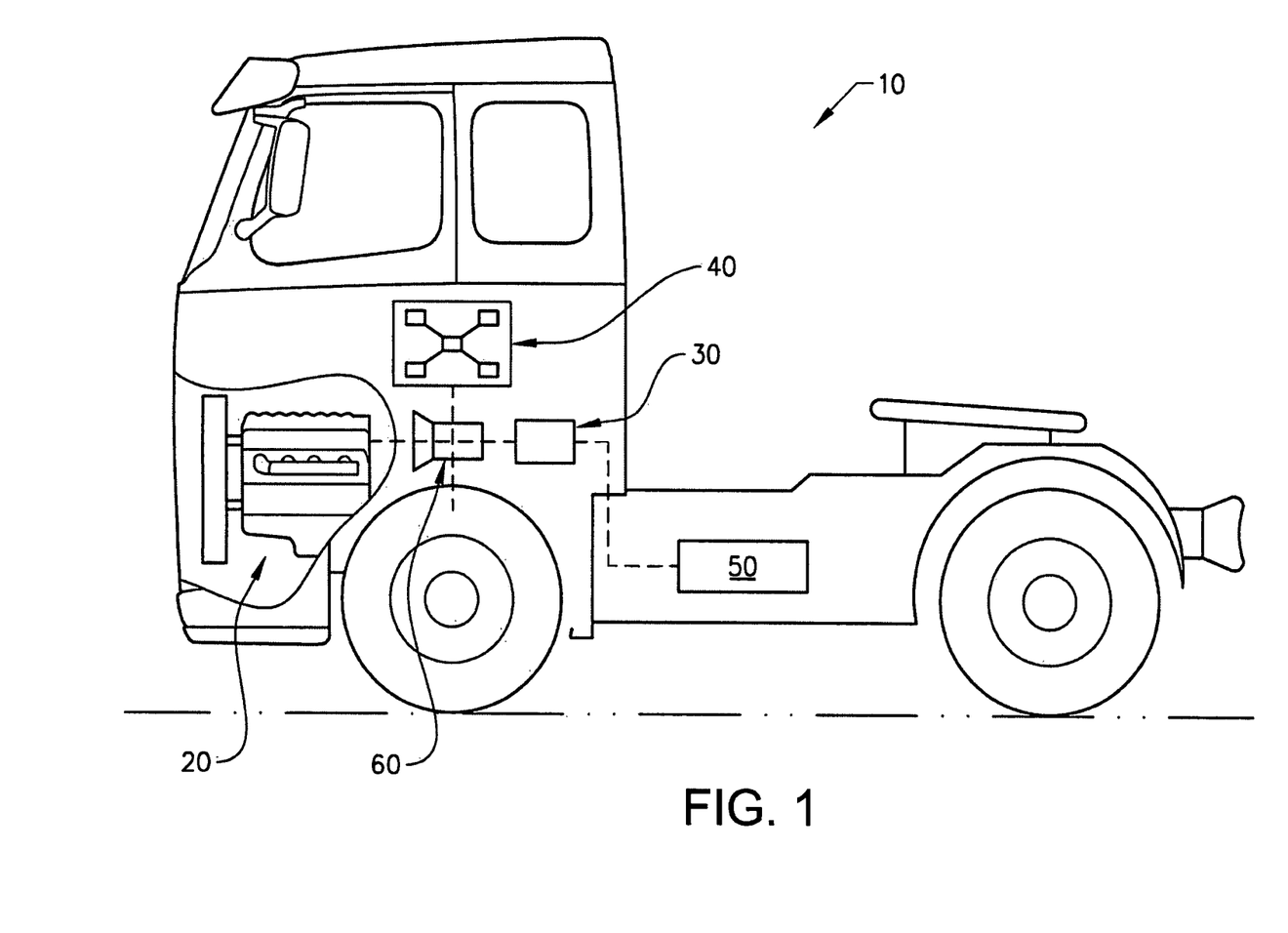
FIG. 1 shows a schematic view of a heavy duty hybrid vehicle comprising a control unit applying the method of the present invention.

FIG. 1 discloses a schematic embodiment of a heavy duty hybrid vehicle 10 comprising an internal combustion engine (ICE) 20, a converter in form of an electric machine 30, an energy buffer 50 in form of an electrical battery, a drivetrain 60 and a control unit 40 for controlling energy flows of said heavy duty hybrid vehicle 10. The electrical battery energy buffer 50 is connected to the ICE 20 via the electric machine converter 30 and the drivetrain 60. The control unit 40 is provided such that the ICE 20, the electric machine converter 30, the drivetrain 60 and the electrical battery energy buffer 50 can be controlled by the control unit 60. The method of the present in Mention is performed by the control unit 40 and is suitable to apply for the vehicle 10. In the embodiment of the present invention disclosed in FIG. 1 the control unit 40 is schematically depicted as one physical component. However, as is obvious for a person skilled in the art, the control unit 40 may also comprise of numerous of vehicle functionality control units interacting as one vehicle control unit.

Figure 2:
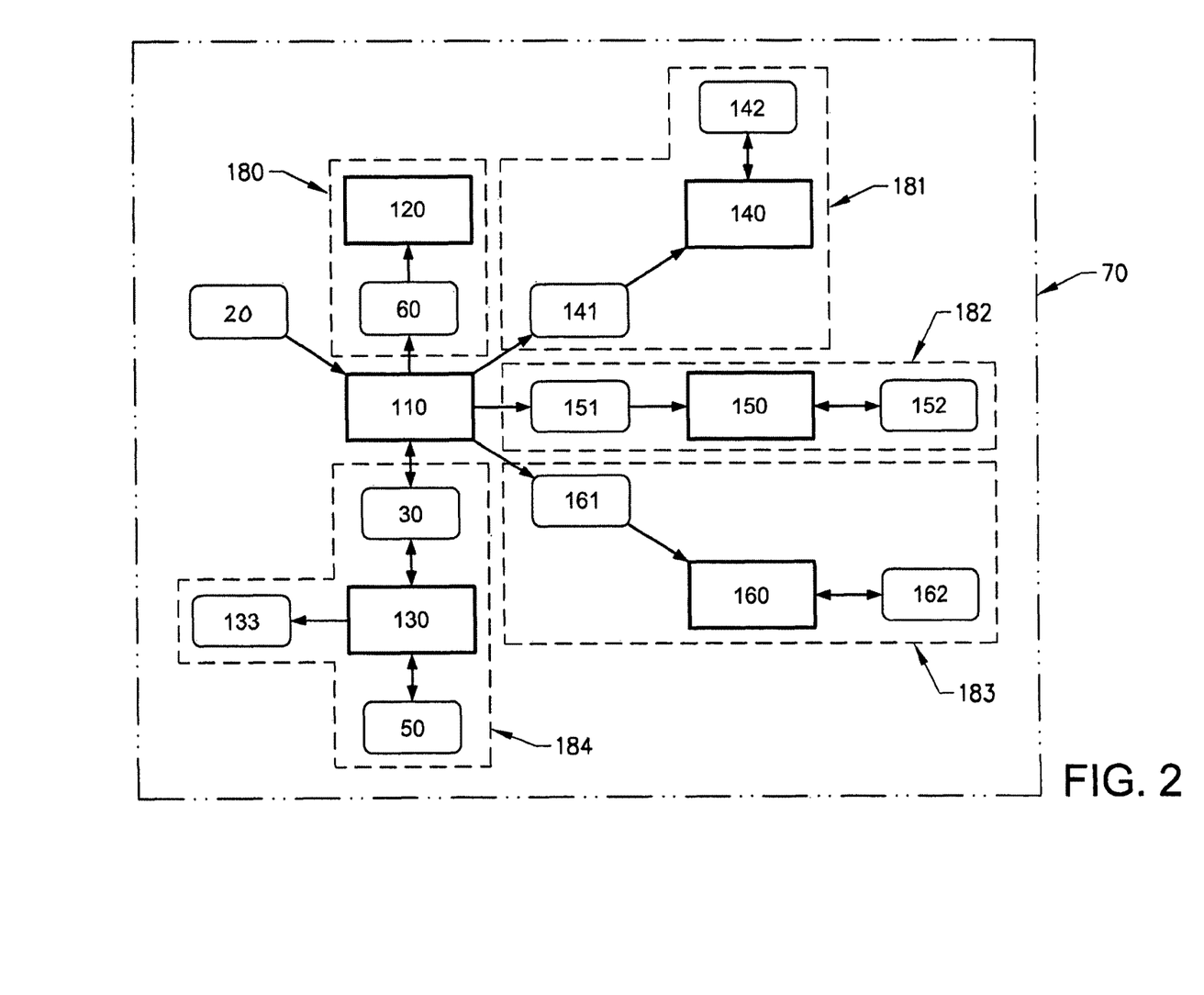
FIG. 2 shows an example of an energy system according to the present invention.

FIG. 2 discloses an embodiment of an energy system 70 of the vehicle 10 disclosed in FIG. 1, wherein the method of the present invention is applied by the control unit 40 for managing the energy flows within such energy systems 70.

The energy system 70 comprises a mechanical energy subsystem 110 connected the ICE 20, wherein the ICE 20 provides the mechanical energy subsystem 110 with mechanical energy when being operated. The mechanical energy generated by the ICE 20 can preferably be converted to energy used for propulsion of the vehicle 10 by converting the mechanical energy to energy used for propulsion of a propulsion energy subsystem 120. The conversion of mechanical energy to energy used for propulsion is performed by the drivetrain 60 of the vehicle 10.

The energy system 70 also comprises an electrical energy subsystem 130, wherein the electrical energy subsystem 130 is connected to the mechanical energy subsystem 110 by the converter 30 in form of the electric machine. The electric machine converter 30 is a bidirectional converter, meaning that the electric machine converter 30 is configured to either convert mechanical energy to electrical energy, electrical energy to mechanical energy or convert both ways simultaneously. The electrical energy subsystem 130 is further connected to the electrical battery energy buffer 50. The electrical battery energy buffer 50 is configured to store electrical energy from the electrical energy subsystem 130 when there is a surplus of energy within the electrical energy subsystem 130 and, dependent on current SoC of the electrical battery energy but 50, provide energy to the electrical energy subsystem 130 when there is a shortage of electrical energy. The energy provided by the electrical battery energy buffer 50 may subsequently be converted by the electric machine converter 30 from the electrical energy subsystem 130 to the mechanical energy subsystem 110 if there is a shortage of energy within the mechanical energy subsystem 110. The additionally provided mechanical energy may subsequently be converted to energy used for propulsion by the drivetrain 60 such that additional propulsion power is available. Additional propulsion power may e.g. be requested during acceleration or when driving uphill. Thus, energy from the electric battery energy buffer 50 may be discharged over time as additional power is requested for propulsion.

The energy system also comprises a number of electric energy consumers 133, wherein such electric consumers 133 convert electric energy from the electric energy subsystem 130 to respective form of energy. An example of such electric consumer is e.g. vehicle seat heaters (converting electrical energy to thermal energy) or headlights (converting electrical energy to kinetic energy in the form of visible light waves). The electric consumers 133 also contribute to that the electrical battery energy buffer will be emptied over time if not being charged.

Further, the energy system 70 comprises a pneumatic energy subsystem 140, wherein the pneumatic energy subsystem 140 is connected to the mechanical energy subsystem 110 by a converter 141 in form of an air compressor. The air compressor converter 141 is driven by mechanical energy, wherein the air compressor converter 141 works as a converter converting mechanical energy from the mechanical energy subsystem 110 to pneumatic energy of the pneumatic energy subsystem 140. The compressed air generated by the air compressor is stored in a compressed air storage tank 142. The compressed air storage tank 142 works as an energy buffer for the pneumatic energy subsystem 140. The compressed air is primarily used for activating the brakes of the heavy duty hybrid vehicle 10. Thus, when driving, which usually involves braking from time to time, the SoC of the compressed air storage tank 142 will be emptied over time.

The energy system 70 also comprises an air condition energy subsystem 150, wherein the air condition energy subsystem 150 is connected to the mechanical energy subsystem 110 by a converter 151 in form of an AC compressor. Like for the air compressor converter 141, the AC compressor converter 151 is driven by mechanical energy, wherein the AC compressor converter 151 works as a converter converting mechanical energy from the mechanical energy subsystem 110 to AC cooling energy of the air condition energy subsystem 150. The air condition system of the vehicle 10 is provided to ensure that the driver requested vehicle compartment temperature is maintained, especially when the ambient temperature is higher than the driver requested vehicle compartment temperature, or when it is sunny. The air condition system uses a refrigerant 152 which is cooled dowry in order to be able to cool down the vehicle compartment. The refrigerant 152 is configured to hold cooling energy and can be considered to be an energy buffer of the air condition energy subsystem 150. Except for that the ambient temperature might be higher than what the driver has requested, the temperature in the vehicle compartment generally increases over time, e.g. due to that both the driver and components of the vehicle generate heat. Thus, in order to maintain the driver requested vehicle compartment temperature the air condition system needs to be activated during shorter or longer time periods. This will, if the compressor converter 151 is not activated in order to recharge the refrigerant energy buffer 152, eventually discharge the refrigerant energy buffer 152.

Additionally, the energy system 70 comprises an engine cooling energy subsystem 160. The engine cooling energy subsystem 160 is connected to the mechanical energy subsystem 110 by a converter 161 primarily in form of a mechanically driven cooling fan. When driven the cooling fan cools down a liquid, circulated by a coolant pump, of an engine cooling circuit such that the temperature of the ICE 20 can be controlled. Accordingly, the engine cooling circuit, or actually the temperature of the cooling fluid of the engine cooling circuit, will act as an energy buffer 162 of the vehicle cooling energy subsystem 160. This is a very simplified way of describing an engine cooling system, just highlighting the important components relevant when applying the method of the present invention. The ICE 20 continuously needs cooling when run in order not to get over heated. Thus, the engine cooling circuit energy buffer will be discharged at a rate proportional to how much and at what load the ICE 20 is running.

For future reference; the drivetrain 60 and the propulsion energy subsystem 120 are considered to constitute a simplified propulsion system 180; the air compressor 141, the pneumatic energy subsystem 140 and the compressed air storage tank 142 are considered to constitute a simplified pneumatic auxiliary system 181; the AC compressor 151, the air condition energy subsystem 150 and the refrigerant 152 are considered to constitute a simplified air condition auxiliary system 182; the cooling fan 161 acting as a converter, the engine cooling energy subsystem 160 and the engine cooling circuit 162 are considered to constitute a simplified engine cooling auxiliary system 183; and the electrical machine 30, the electrical energy subsystem 130 and the electrical battery 50 are considered to constitute a simplified electric generation auxiliary system 184.

The schematic view of the very simplified energy system 70 according to the example disclosed in FIG. 2 is intended for explanatory purposes only and should not be seen as limiting.

The different exemplifying components 20, 30, 50, 60, 141, 142, 151, 152, 161, 162, 133, and how energy is provided between respective components 20, 30, 50, 60, 141, 142, 151, 152, 161, 162, 133, is controlled by a control unit.

Figure 3:
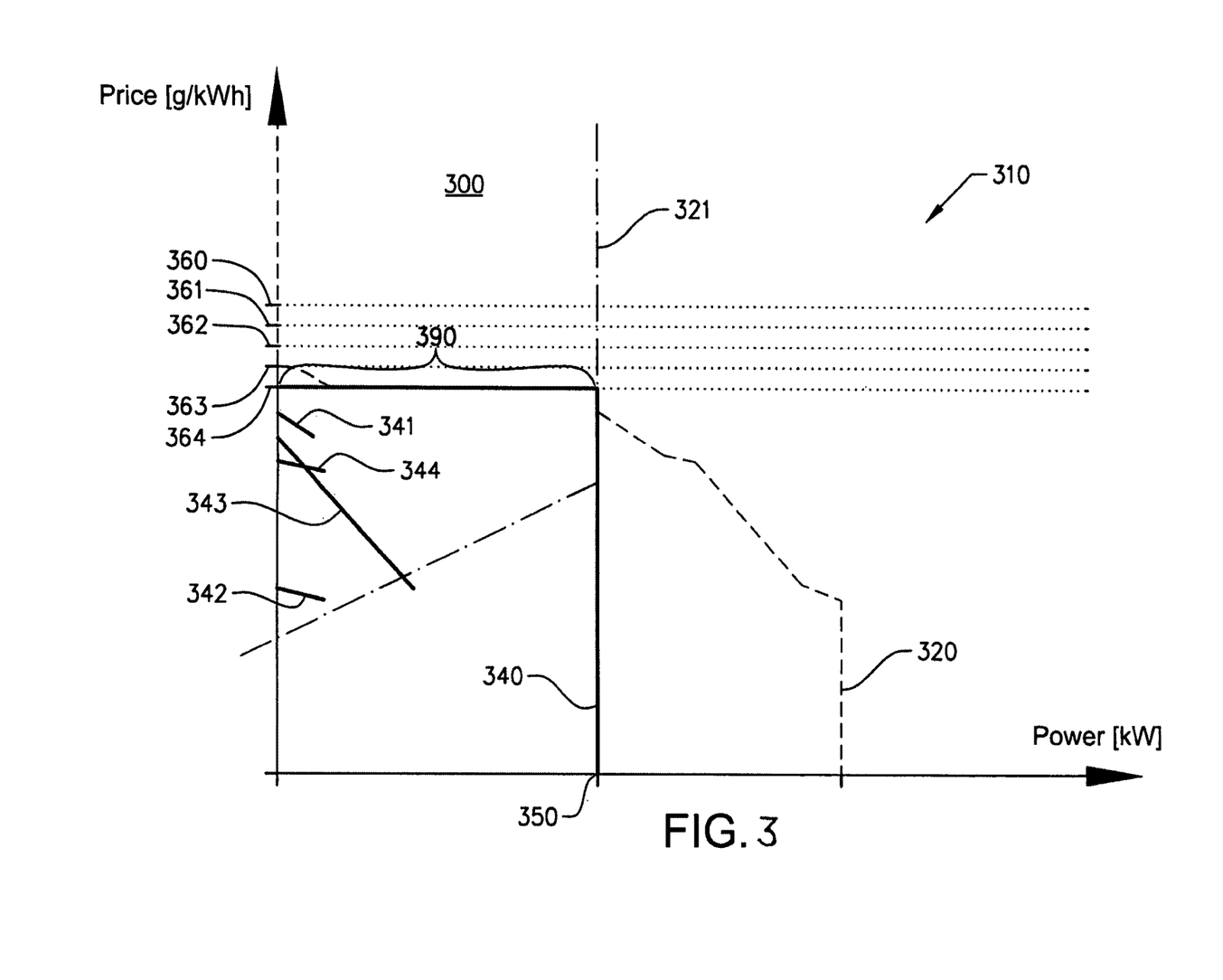
FIG. 3 shows a power versus price graph for an example of an energy system when the energy system is in a first vehicle energy state.
Figure 4:
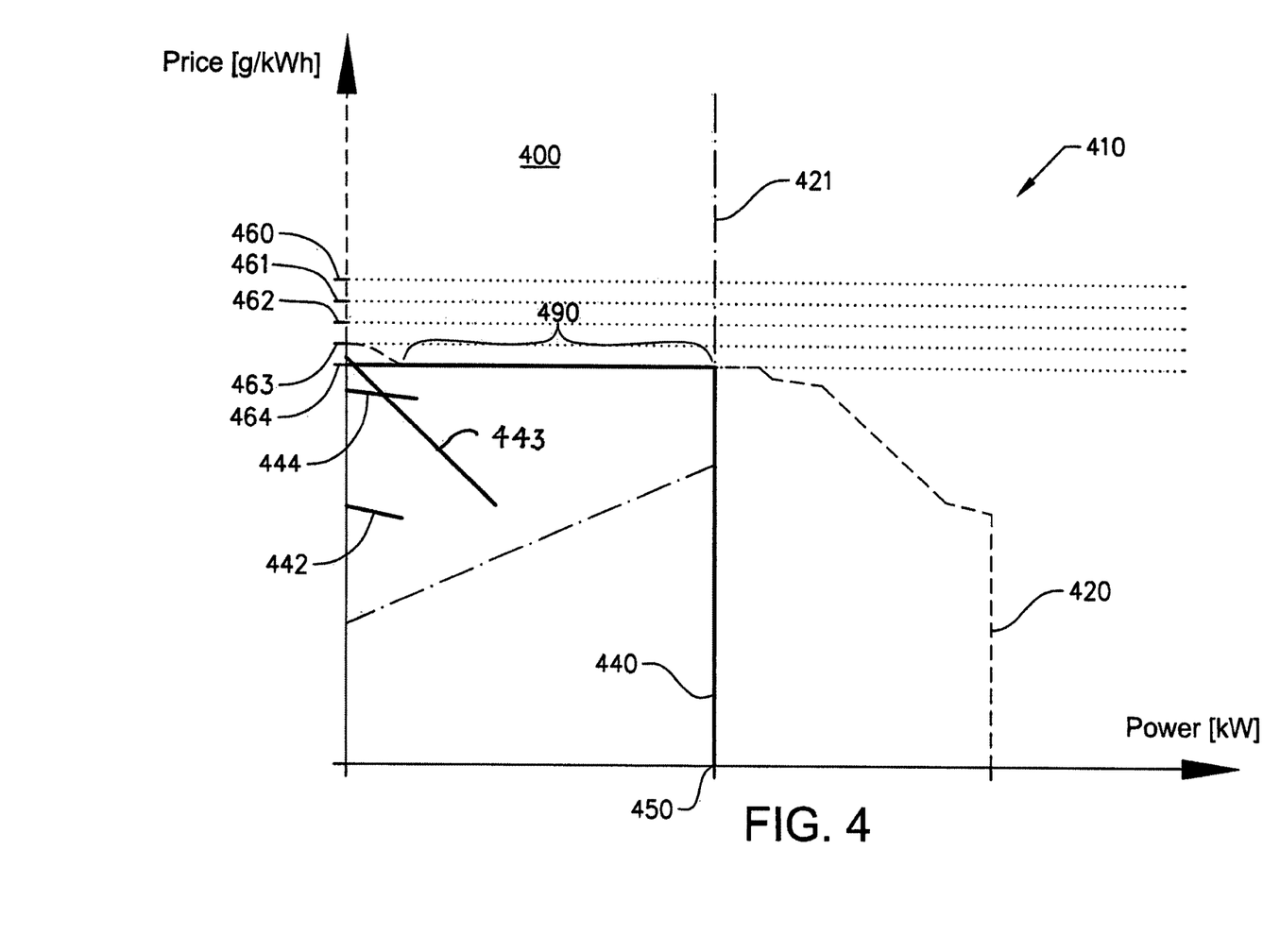
FIG. 4 shows a power versus price graph for an example of an energy system when the energy system is in a second vehicle energy state.
Figure 5:
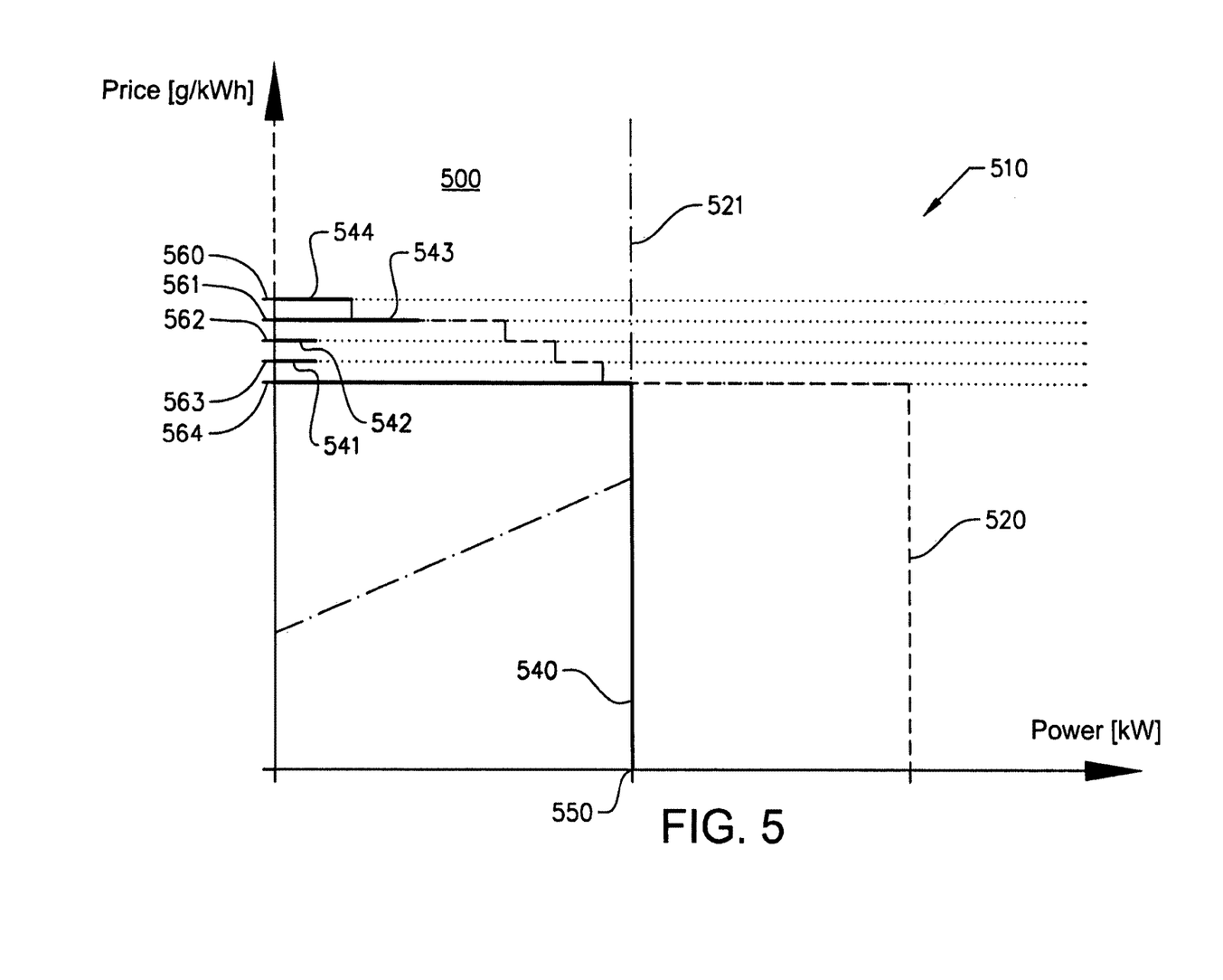
FIG. 5 shows a power versus price graph for an example of an energy system when the energy system is in a third vehicle energy state.

FIG. 3, FIG. 4 and FIG. 5 shows graphs 310, 410, 510 disclosing quantity of power versus price for energy of the energy system 70 of the vehicle 10 according to FIG. 1 and FIG. 2 when the vehicle 10 is in a first (FIG. 3), a second (FIG. 4) and a third (FIG. 5) vehicle energy state 300. Power is shown on the x-axis and is specified in kW. Price is shown, on the y-axis and is specified in g/kWh, thus expresses a cost in grams of diesel for providing one kWh. FIG. 3, FIG. 4 and FIG. 5 disclose how power management for a mechanical energy subsystem 110, where mechanical energy is the form of enemy controlled by the control unit, works according to the present invention. The examples shown in FIG. 3, FIG. 4 and FIG. 5 could represent a typical sequence of events when the vehicle 10 drives uphill.

For the vehicle energy states disclosed in FIG. 3, FIG. 4 and FIG. 5 the theory of supply and demand is used by the control unit for calculating unitary energy prices and, based on such calculated unitary energy prices, energy supply price functions and energy demand price functions. In the graphs 310, 410, 510 the demanded quantity of power in regards to price for energy for a number of converters are disclosed.

The unitary energy price indicated expresses how much a converter 30, 60, 141, 151, 161 of respective energy subsystem momentarily is able or allowed to pay for converting mechanical energy to the energy form to which respective converter 30, 60, 141, 151, 161 is converting to. The price respective converter 30, 60, 141, 151, 161 is able to pay for a quantity of power is expressed by the energy demand price functions. An energy demand price function for respective converter 30, 60, 141, 151, 161 can be expressed by:

$$p\_in = p\_out * eta(Q), \text{ where}$$

p_in is the price for the energy converted by respective converter 30, 60, 141, 151, 161, p_out is the price for the energy respective converter 30, 60, 141, 151, 161 has convened, and eta(Q) is the marginal efficiency for respective converter 30, 60, 141, 151, 161, wherein the marginal efficiency is dependent on the quantity of convened power Q.

The forms of energy to which the mechanical energy can be convened according to the embodiment disclosed in FIGS. 3, 4 and 5 are energy used for propulsion, i.e. translational kinetic energy, AC cooling energy, electrical energy, engine cooling energy and pneumatic energy. Conversion of mechanical energy to translational kinetic energy of the propulsion energy subsystem 120 is performed by a drivetrain 60, wherein the drivetrain 60 is considered to comprise the same vehicle components as a powertrain except for that the ICE 20 is not part of the drivetrain 60. Conversion of mechanical energy to AC cooling energy of the air condition energy subsystem 150 is preferably performed by the AC compressor 151. Conversion, of mechanical energy to electrical energy of the electrical energy subsystem 130, i.e. electrical generation, is preferably performed by the electric machine 30, conversion of mechanical energy to engine cooling energy of a cooling energy subsystem 160 is preferably performed by the cooling fan 161 acting as a converter and conversion of mechanical energy to pneumatic energy of a pneumatic energy subsystem 140 is preferably performed by the air compressor 141.

Respective energy subsystem 130, 140, 150, 160 additionally comprises an energy buffer 50, 142, 152, 162 each. The pneumatic energy subsystem 140 comprises an energy buffer in form of the compressed air storage tank 142, the air condition energy subsystem 150 comprises an energy buffer in form of the refrigerant temperature, the engine cooling energy subsystem 160 comprises an energy buffer in form of the temperature of the engine cooling circuit 162 and the electrical energy subsystem 130 may comprise an energy buffer in form of the SoC of the electrical battery 50.

Also the propulsion energy subsystem 120 may comprise an energy buffering functionality. This is only true if the vehicle speed requested by the driver is not considered to be an absolute requirement, but that small deviations in vehicle speed, preferably set to be within a relatively narrow vehicle speed deviation interval, is allowable. For the propulsion energy subsystem 120 the energy buffering functionality is the momentary kinetic and potential energy that a vehicle 10 possesses. However, since the present invention refers to a method applied by a control unit 40 for managing the energy flows within an energy system 70 of a vehicle 10 this is not further discussed herein.

Thus, the systems 180-184 that are concerned are the propulsion system 180, the air condition auxiliary system 182, the electric generation auxiliary system 184, the engine cooling auxiliary system 183 and the pneumatic auxiliary system 181. Even though when referring, to price limits 360-364, 460-464, 560-564 what actually is referred to is the maximum price a specific converter 30, 60, 141, 151, 161, converting energy from the one energy subsystem—the mechanical energy subsystem 110 according to the examples disclosed in FIG. 3-5—to another energy subsystem 120, 130, 140, 150, 160, is able to pay. Herein respective price limit 360-364, 460-464, 560-564 is referred to as the price limit for respective system 180-184. Also the demand price functions 340-344, 440-444, 540-544 are referred to as demand price functions of respective system 180-184. Thus, when e.g. referring to electric generation price limit 362, 462, 562 what actually is referred to is the maximum price one specific converter, in this case the electric machine 30, is able or allowed to pay for converting mechanical energy of the mechanical energy subsystem 110 to electrical energy of the electrical energy subsystem 130. Correspondingly, when e.g. referring to propulsion price limit 364, 464, 564 what actually is referred to is the maximum price the drivetrain 60, considered to be the converter from mechanical energy to, energy used for propulsion, is able to pay for convening mechanical energy to energy used for propulsion.

According to the examples of the present invention disclosed in FIG. 3, FIG. 4 and FIG. 5 power to the air compressor 141 of the pneumatic auxiliary system 181 has the highest priority, power to cooling fan 161 of the engine cooling auxiliary system 183 the second highest, power to electric machine 30 of the electric generation auxiliary system 184 the third, power to AC compressor 151 of the air condition auxiliary system 182 the fourth and power used for propulsion has the lowest priority. This is given by the order of respective price limits 360-364, 460-464, 560-564 where power to air compressor 360, 460, 560 has the highest price limit and power used for propulsion 364, 464, 564 has the lowest price limit.

The price limits 360-364, 460-464, 560-564 indicates the price respective converter 30, 60, 141, 151, 161, convening from mechanical energy to respective energy subsystem 120, 130, 140, 150, 160 of respective system 180-184, is allowed to pay for energy from the mechanical energy subsystem 110. As will be shown more in detail later on will that price limits 360-364, 460-464, 560-564 increase as the SoC of respective energy buffer 50, 142, 152, 162 of respective energy subsystem 130, 140, 150, 160 decrease.

The examples of how the present invention can be applied that is shown in FIG. 3, FIG. 4 and FIG. 5 discloses an aggregated energy demand price function 320, 420, 520, an aggregated energy supply price function 321, 421, 521 and demand price functions for energy used for propulsion 340, 410, 540, for AC cooling energy 341, 441, 541, for electrical energy 342, 442, 542, for engine cooling energy 343, 443, 543 and for pneumatic energy 344, 444, 544. The aggregated demand price functions 320, 420, 520 are obtained by summarizing the energy demand price functions of respective energy converter 340-344, 440-444, 540-544. The aggregated supply price function 321, 421, 521 is solely determined by the power the ICE 20 is able to deliver. The aggregated supply price function 321, 421, 521 is limited by the maximum quantity of power the ICE 20 is able to deliver 350, 450, 550.

The demand price functions for propulsion 340, 440, 540 represents when maximum ICE 20 output is requested, thus en acceleration pedal is depressed to 100%.

Referring explicitly to the example described and disclosed in FIG. 3, disclosing when the vehicle 10 is in the first vehicle energy state 300. In the example described and disclosed in FIG. 3 the compressed air storage tank energy buffer 142 of the pneumatic energy subsystem 140 is at least partially filled with compressed air, the refrigerant energy buffer 152 of the air condition energy subsystem 150 is at least partially cooled down, the temperature of the engine cooling circuit energy buffer 162 of the engine cooling energy subsystem 160 is lower than the top tank temperature of the ICE 20 and the electrical battery energy buffer 50 of the electrical energy subsystem 130 is at least partially charged. Additionally, the driver has requested maximum propulsion power by fully depressing an acceleration pedal.

That respective energy buffer 50, 142, 152, 162 at least partially is charged can be assumed since the energy demand price functions for the air condition system 341, for electric generation 342, for the engine cooling system 343 and for the air compression system 344 are lower than the energy demand price function for propulsion 340. The low prices indicate that none of the auxiliary systems 181-184 are able to pay a higher price for the mechanical energy provided by the ICE 20 than the propulsion system 180.

In the example, disclosed in FIG. 3 the driver requests maximum propulsion power and since no auxiliary system 181-184 is able to pay more than the propulsion system 180 all power that possibly can be supplied by the ICE 20 is used for propulsion 390, wherein the quantity of power used for propulsion 390 is equal to what the ICE 20 can deliver.

Referring now explicitly to the example described and disclosed in FIG. 4, disclosing when the vehicle 10 is in the second vehicle energy state 400. In FIG. 4 an example where the mechanical energy generated by the ICE 20 has been used exclusively for propulsion of the vehicle 10 for a period of time is disclosed. The second vehicle energy state 400 disclosed in FIG. 4 may be an energy state of the vehicle 10 subsequent of the vehicle being in the first vehicle energy state 300 disclosed in FIG. 3. For the first vehicle energy state 300 disclosed in FIG. 3, except for propulsion no mechanical energy generated by the ICE 20 was used to provide energy any auxiliary system 181-184. Instead the auxiliary systems 181-184 used energy from respective energy buffer 50, 142, 152, 162.

To give an example:

The ICE 20 needs constant cooling which is provided by the engine cooling auxiliary system 183. For a period of time the engine cooling energy subsystem 160 has only been provided with cooling energy from the energy buffering functionality, the engine cooling circuit, 162 of the engine cooling energy subsystem 160. As long as the temperature of the engine cooling circuit 162 is lower than the ICE 20 the ICE 20 can be cooled down, even if the efficiency decreases as the temperature of the engine cooling circuit 162 approaches the temperature of the ICE 20. Thus, after a while the temperature of the engine cooling circuit 162 has increased that much that independently of how hard the water pump of the engine cooling auxiliary system 183 works the ICE 20 will not be cooled down without starting the cooling fan, herein considered to be the converter 161 of the energy subsystem 160. Thus, the energy buffer 162 of the engine cooling energy subsystem 160 has been drained.

In the example disclosed in FIG. 3, as well in the examples disclosed FIG. 4 and FIG. 5 below, the SoC of all energy buffers 50, 142, 152, 162 are discharged at the same rate. This approach is used for clarification purposes but obviously this is not the case in real life.

Consequently, driving respective auxiliary system 181-184, will ultimately drain respective energy buffer 50, 142, 152, 162. As the energy buffers 50, 142, 152, 162 of respective energy subsystem 130, 140, 150, 160 is drained the price respective energy subsystem 130, 140, 150, 160 is able to pay for converting mechanical energy to respective form of energy will increase. By comparing the vehicle energy states 300, 400 disclosed in the examples of FIG. 3 and FIG. 4 respectively, it can be seen that respective energy demand price functions 441-444 have been shifted along, the y-axis towards higher energy prices.

According to the example disclosed in FIG. 4, where the vehicle 10 is in the second vehicle energy state 400, the energy demand price function 441 of the air condition energy subsystem 150 is above the propulsion price limit 464. This implies that the air condition auxiliary system 182 is higher prioritized than the propulsion system 180 and that the air condition price limit 463 is higher set than the propulsion price limit 464. Thus, when air condition price limit 463 increases to be higher than the propulsion price limit 464, conversion of mechanical energy to AC cooling energy is initiated by the AC compressor 151 and the mechanical energy converted by the drivetrain 60 to energy used for propulsion is reduced with corresponding quantity.

Additionally, also the energy demand price function 443 of the engine cooling auxiliary system 183 exceeds the propulsion price limit 464, indicating that the conversion of mechanical energy to engine cooling energy, performed by the cooling fan converter 161, has been activated. Once again the power needed for conversion to engine cooling energy reduces the available energy used for propulsion.

The quantity of power used for propulsion 490 will be what is left after the energy needed for air condition has been subtracted together with a part of the energy need of the engine cooling auxiliary system 183.

Referring now to FIG. 5 disclosing when the vehicle is in the third vehicle energy state 500, wherein in said third vehicle energy state 500 all energy buffers 50, 142, 152, 162 of respective energy subsystems 130, 140, 150, 160 are emptied. All energy demand price functions 541-544 are higher than the propulsion price limit 564, and since the price limits 560-563 of the auxiliary systems 181-184 other than the propulsion system 180 are higher than the propulsion price limit 564 all auxiliary systems 181-184 are provided with mechanical energy which is converted to respective form of energy of respective energy subsystem 130, 140, 150, 160, before mechanical energy is converted to the propulsion energy subsystem 120. The pneumatic auxiliary system 181 has the highest priority since the compressed air price limit 560 is the highest price limit, and is consequently provided with energy first. The engine cooling auxiliary system 183 has the second highest priority, the electric generation auxiliary system 184 the third highest, the air condition auxiliary system 182 the fourth highest and finally the propulsion system 180 has the lowest priority.

The quantity of power used for propulsion 590 will be what is left after the energy needs of all other auxiliary systems 181-184 are fulfilled.

The exemplary energy system 70 of FIG. 2 and the exemplary prioritisation of the energy subsystems 110, 120, 130, 140, 150, 160, and how they are defined, of FIGS. 2, 3 and 4 are just examples of how the method of the present invention applied by the control unit 40 can be implemented, what functionalities that may be concerned and how systems, subsystems etc. can be defined. All operations disclosed are controlled by the control unit 40 of the vehicle 10 according to the present invention.

Thus, it is to be understood that the present invention is not limited to the examples and embodiments described above and illustrated in the drawings; rather, the skilled person will recognize that many changes and modifications may be made within the scope of the appended claims.

The invention claimed is:

1. A method performed by a control unit for controlling energy flows of a vehicle, wherein the vehicle comprises an energy system which comprises a plurality of energy subsystems, wherein within each energy subsystem one form of energy is used, and wherein the energy subsystems are operationally connected by converters, wherein converters are devices converting at least one form of energy to another form of energy, the method comprising
 setting, via the control unit, a unitary energy price for a quantity of energy used within a respective energy subsystem continuously,
 continuously controlling energy flows within the vehicle via the control unit at a first sample frequency by
  setting a respective unitary energy price for a respective energy subsystem for a sample interval t+n, wherein the respective unitary energy price is dependent on a total energy demand and a total energy supply of the respective energy subsystem, and during the sample interval t+n;
  providing a quantity of power to a first energy subsystem from a second energy subsystem, wherein the provided quantity of power corresponds to a determined supplied quantity of power of the converters at the unitary energy price of the first energy subsystem, wherein the quantity of power provided is limited by a power limitation of a common converter providing a quantity of power to the first energy subsystem from the second energy subsystem,
 setting, via the control unit, a price limit for a converter converting energy to an energy subsystem,
 providing, via the converter, energy to the first energy subsystem from the second energy subsystem only if a unitary energy price of the second energy subsystem is lower than the price limit of the converter,
 continuously updating, via the control unit, the price limit of the converter according to a second sample frequency, and wherein the second sample frequency is longer than the first sample frequency.

2. A method according to claim 1, wherein the energy systems at least comprises a mechanical energy system and a propulsion energy system.

3. A method according to claim 1, wherein the respective price limits are provided with a prioritisation, such that a more prioritised energy subsystem is provided with a higher price limit.

4. A method according to claim 1, wherein the control unit is;
 setting a common price limit for all converters converting energy from one common energy subsystem to another common energy subsystem.

5. A method according to claim 1, wherein the control unit is;
 setting respective price limit for respective energy subsystem dependent on a driver command.

6. A method according to the preceding claim 5, wherein the driver command is at least one among;
 selecting a driving mode, or
 selecting a driver specific vehicle setting.

7. A method according to claim 1, wherein the control unit is;
 setting respective price limit dependent on at least one ambient condition.

8. A method according to claim 7, wherein the at least one ambient condition is one of;
 topography,
 ambient temperature,
 air humidity,
 indication of slippery road conditions,
 driving schedule,
 wet conditions, or
 sunny conditions.

9. A method according to claim 1, wherein the price limits are predetermined.

10. A non-transitory computer readable medium carrying a computer program for performing a method for controlling energy flows of a vehicle when the computer program is run by a control unit, wherein the vehicle comprises an energy system which comprises a plurality of energy subsystems, wherein within each energy subsystem one form of energy is used, and wherein the energy subsystems are operationally connected by converters, wherein the converters are devices converting at least one form of energy to another form of energy, the method comprising:
 setting, via the control unit, a unitary energy price for a quantity of energy used within p respective energy subsystem continuously,
 continuously controlling energy flows within the vehicle via the control unit at a first sample frequency by
  setting a respective unitary energy price for a respective energy subsystem for a sample interval t+n, wherein the respective unitary energy price is dependent on a total energy demand and a total energy supply of the respective energy subsystem, and during the sample interval t+n;

providing a quantity of power to a first energy subsystem from a second energy subsystem, wherein the provided quantity of power corresponds to a determined supplied quantity of power of the converters at the unitary energy price of the first energy subsystem, wherein the quantity of power provided is limited by a power limitation of a common converter providing a quantity of power to the first energy subsystem from the second energy subsystem, setting, via the control unit, a price limit for a converter converting energy to an energy subsystem, providing, via the converter, energy to the first energy subsystem from the second energy subsystem only if a unitary energy price of the second energy subsystem is lower than the price limit of the converter, continuously updating, via the control unit, the price limit of the converter according to a second sample frequency, and wherein the second sample frequency is longer than the first sample frequency.

\* \* \* \* \*